United States Patent [19]
Billiu

[11] 3,903,224
[45] Sept. 2, 1975

[54] AUTOMOTIVE BODY PANEL MOLDED FROM POLYCARBONATE FOAM

[75] Inventor: Charles R. Billiu, Franklin, Mich.

[73] Assignee: Research Plastics Industries, Inc., Warren, Mich.

[22] Filed: Nov. 3, 1972

[21] Appl. No.: 303,511

[52] U.S. Cl. ............ 264/46.7; 161/183; 260/37 PC; 264/45.5; 264/50; 264/DIG. 14; 296/31 R
[51] Int. Cl.$^2$.................. B29D 27/00; B62D 29/04
[58] Field of Search .. 260/77.5 D; 264/45, DIG. 14, 264/46.7, 45.5, 50; 161/183; 296/31 R

[56] References Cited
UNITED STATES PATENTS 2,950,266  8/1960  Goldblum ...................... 161/183 X

FOREIGN PATENTS OR APPLICATIONS 1,176,813  1/1970  United Kingdom................... 260/45

OTHER PUBLICATIONS

Schnell, Polycarbonates, Interscience, New York, 1964, pp. 194–198, 203–204.
Christopher et al., Polycarbonates, Reinhold, New York, 1962, pp. 151–152.
Bikales, Mech. Props. of Polymers, Encyclopedia Reprints, Wiley–Interscience, N.Y., 1971, pp. 211–212.
Bikales, Molding of Plastics, Encyclopedia Reprints, Wiley–Interscience, N.Y., 1971, pp. 51–57.

Primary Examiner—H. S. Cockeram
Attorney, Agent, or Firm—Basile and Weintraub

[57] ABSTRACT

A structural foam article prepared by injection foam molding a unique polycarbonate resin has the definitive characteristics prerequisite for and is eminently useful as an external automotive body panel. The structural foam is prepared by injection foam molding the resin, which is pre-dried, either with high or low pressure processes at a mold temperature of from about 90° to 250°F, in a period of about 0.5 to 6 minutes. The polycarbonate resin is essentially derived from the reaction of phosgene and/or a bischloroformate and Bisphenol A and has admixed therewith silicon dioxide.

7 Claims, No Drawings

AUTOMOTIVE BODY PANEL MOLDED FROM POLYCARBONATE FOAM

BACKGROUND OF THE INVENTION

1. Field of the Invention

The present invention pertains to structural foam articles. More particularly the present invention pertains to structural foam articles injection foam molded from polycarbonate resins and which have the structural integrity and physical properties prerequisite to be eminently useful as an automotive body panel. Even more particularly the present invention pertains to such automotive body panels and methods of manufacture therefor.

2. Prior Art

The concept of a mass production "thermoplastic" car has long been known. However, the realization of such an automotive vehicle has heretofore not been attained.

A plurality of reasons underlie the failure to mass produce an exterior vehicle body out of a thermplastic or resinous material. Foremost, among the underlying causes for the inability to mass produce such automobiles or vehicles is directly attributable to the material per se. The materials heretofore employed were inherently of slow mold time. Generally, the prior art materials, such as, polypropylene, have a low melting point which necessitate the longer mold time. These inherently slow mold times negate any concept of mass production.

Another underlying and basic cause for the inability to realize the basic conception under discussion herein is the inability of the prior art material, such as, amides, e.g., hexamethylene adipamide, caprolactoms, polypeptides, and the like, fiberglass, etc. to provide the structural integrity necessary in present day vehicles. Presently known "thermoplastic" materials, used in vehicle exteriors are either difficult to process, brittle, combustible and have poor temperature properties, thus, negating their overall utility. Repair is, also, extremely expensive and negates the marketability for such products. Furthermore, the presently known products impart too much weight to the vehicle.

On the other hand, the present invention is predicated on the discovery that a unique polycarbonate resin can be successfully deployed in the manufacture of structural foam automotive panels, which can be assembled into an entire body, with the necessary rapidity essential for mass production. Moreover, the panels prepared from the structural foam have the structural rigidity and physical properties necessary for complete automobile body in present day automotive markets.

SUMMARY OF THE INVENTION

In accordance with the present invention a structural foam article which is eminently useful as an exterior vehicle body panel, assembleable into an entire automotive body, is prepared by injection foam molding a unique polycarbonate resin in the presence of a blowing agent, in a time period of from about ½ to 6 minutes. The foam molding can be achieved either with high or low pressure processes wherein the mold or mold cavity is maintained at a temperature of from about 90° to 250°F.

In carrying out the process it is essential that the polycarbonate resin be substantially moisture free. Generally, a maximum moisture content of 0.015% of water based on the weight of polycarbonate is desirable. This can advantageously be acheived by desiccant pre-drying of the resin.

As noted, the panels produced herefrom are structural foams which can be formed on any suitable injection foam molding machine either unit high or low pressure injection rates and systems.

The polycarbonate resin used to prepare the structural foam hereof is a species of the polycarbonate resin derived from 4,4'-(isopropylidene) diphenol 2, 2-bis (4-hydroxphenyl) propane, commonly known as Bisphenol A, in admixture with specified quantities of silicon dioxide.

For a more complete discussion of the present invention reference is made to the following detailed description and examples.

DETAILED DESCRIPTION OF THE PREFERRED EMBODIMENTS

It has now been unexpectedly found that a specific polycarbonate of 2, 2-bis (4-hydroxphenyl) propane (Bisphenol A) is a uniquely advantageous in the manufacture of an exterior vehicle body panel. Moreover, it has been found unexpectedly that such panels produced from the polycarbonate overcome all the problems of the prior art heretofore associated with the concept of a "thermoplastic" automotive body, to produce the "thermoplastic" automobile.

The polycarbonate contemplated for use in the present invention, generally, as noted, is the polycarbonate resin of Bisphenol A. The polycarbonate is generally prepared from the reaction of phosgene and 4,4'-(isopropylidene) diphenol or 2,2-bis (4-hydroxphenyl) propane:

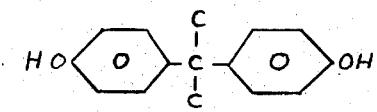

In lieu of phosgene the bischloroformate of a diol or a mixture of phosgene and the bischloroformate of a diol can be employed in the preparation of the polycarbonate.

The manufacture of the polycarbonate from the bischloroformate of a diol is generally carried out in an aqueous solution containing a methylene chloride phase.

The diols from which the bischloroformate is prepared may be either aromatic, aliphatic, or alicyclic. Further, the diols can be primary, secondary, or tertiary. The carbon chain of the aliphatic diols may be straight or branched, and may contain from two to 20 carbon atoms. Examples of representative useful diols are ethylene glycol; 1,6-hexane diol; 2,5-norbornanediol; 1,4-cyclohexanediol; 2,5-dimethyl - 2,5-hexane diol, 4,4'-isopropylidene diphenol and the like.

The polycarbonates of Bisphenol A are commerically available products and are generally sold under the trademark "Lexan." The preparation of the polycarbonates is, also, detailed in a plurality of prior art references. See, inter alia, U.S. Pat. Nos. 3,254,047 and 3,386,935.

Within the general class of polycarbonates of Bisphenol A it has been found that a particularly useful polycarbonate resin product is marketed under the names "Lexan 900" and "920" which are sold by General Electric. These products, which have a melting point of about 550° to 575°F, are generally prepared from the reaction of phosgene and Bisphenol A which contains silicon dioxide in admixture therewith. The presence of the silicon dioxide endows the structural foam prepared therefrom with improved physical and processing properties which renders the resulting structural foams eminently useful herein.

The presence of the silicon dioxide in the resin is critical in other areas also. In essence the silicon dioxide provides the ability to control the foam characteristics as regards skin thickness (which is also a function of mold temperature), surface smoothness and uniformity of the cells within the cellular core of the structural foam product.

The polycarbonate resin generally contain from about 80 to 99% by weight of polycarbonate, based on the total weight, and from about 1 to 20% by weight of silicon dioxide in admixture therewith, based on the total weight. Preferably, the polycarbonate resin contains from about 93 to 97% by weight of polycarbonate, based on the total weight, and from about 3 to 7% by weight of silicon dioxide, based on the total weight of the resin.

In accordance with the present invention, the herein defined polycarbonate resin is used to prepare an automotive exterior body panel by injection foam molding.

Generally the process comprises injection foam molding the polycarbonate resin in the presence of a suitable blowing agent and wherein the resin is substantially moisture-free. As previously noted in injection foam molding the structural foams hereof either high pressure or low pressure injection techniques and equipment can be utilized.

Representative suitable blowing agents are, for example, nitrogen, and other nitrogen-release compounds, which are anhydrous and non-reactive with the polycarbonate resin.

The amount of blowing agent employed herein will generally range from about 0.001 to about 0.3% by weight, based on the weight of the polycarbonate resin. Preferably, the blowing agent will be employed in an amount ranging from 0.2 to about 0.3% by weight, based on the weight of the polycarbonate resin.

In foaming the polycarbonate resin, it is essential that it be substantially moisture-free prior to deploying it in the process hereof. The optimum moisture content of the resin is generally about 0.015% by weight of water based on the weight of the resin. Advantageously, the resin can be pre-dried prior to deploying it. Ordinarily, by disiccant drying the resin for a period of about 2 to 3 hours at a temperature of from about 225° to 275°F, the moisture content thereof can be reduced to the optimum range. After drying, the resin is then ready for use. If drying is not employed then a side reaction is possible between the resin and water.

When utilizing a low pressure injection foam molding process the process generally comprises:
a. pre-drying the resin,
b. delivering the pre-dried resin to an extruder maintained at a temperature of about 500° to 600°F, and at a pressure of from about 2,000 to 4,000 psi,
c. admixing the blowing agent with the resin in the extruder,
d. transferring the resin and blowing agent to an accumulator maintained at the temperature of from about 550° to 600°F, and
e. injecting under pressure the resin and blowing agent into a suitable mold at a temperature of from about 90° to 250°F.

The extruder is generally a two-stage screw-type or other suitable extruder having a medially disposed vent through which the blowing agent is introduced to the resin. The blowing agent is normally at a pressure of about 1,800 to 2,800 psi.

The accumulator generally comprises a piston operated storage space wherein the foamable mixture is introduced forwardly of a piston. The piston is used to "shoot" the mixture into the mold through suitable nozzle arrangements. The mixture creates a pressure forwardly of the piston. A hydraulic fluid stored rearwardly of the piston is used to equilibrate the pressure in the accumulator until hydrostatic equilibrium is achieved.

The piston is connected through a rod to a pressure source, such as, pressurized nitrogen gas, which is used to drive the piston once the hydrostatic equilibrium is acheived. By driving the piston the foamable mixture is forced out of the accumulator and into the mold. Interposed between the accumulator and the mold are the injection nozzles which deliver the mixture at a pressure of from about 3,000 to 3,500 psi. Injection speed varies from about 3 to 8 pounds per second.

The mold is then placed under hydraulic pressure, from which the finished product is attained.

The actual construction of such equipment are known and commercially available.

With regard to high pressure processes, they employ essentially the same equipment as the low pressure process except that the extruder also functions as the accumulator. The injection pressure from the nozzles, however, ranges from about 10,000 to 15,000 psi, with the other process parameters remaining substantially the same.

By either process a structural foam article in accordance herewith is produced in about 0.5 to 6 minutes, and preferably in about 0.5 to 2 minutes.

The foam articles hereof are skinned cellular products having a controlled skin thickness. By varying the density of the resin and mold temperature, a one-fourth inch thickness foam can have a skin thickness of from about 0.01 to 0.10 inches. At a lower mold temperature the article will have a thicker skin than a similar article prepared in a mold at a high temperature.

After the molding operation is completed the injection foam molded structural foam is removed from the mold and is ready for use.

After removing the article from the mold no substantial further treatment thereof is required. Except for minor spurs, or the like, the article is substantially finished.

It is contemplated by the present invention that the injection molded structural foam article be subjected to surface preparation for subsequent treatment such as the application of a decorative coating such as a paint, lacquer, enamel, or the like, for aesthetic purposes. In such instances a surface treatment to render the article receptive to decorative coating may be required.

Because of the specified utility of the instant article, it may be necessary to add further structural reinforcement to the panels molded such as at the window sections or the like. In such situations the foamed resin is used to encapsulate a steel member for a roll cage or the like. In such instances, the resin is injection molded around the member. However, the process parameters still remain substantially the same.

It should be noted, in accordance with the instant invention, that the structural foam automotive body panels produced herein are distinct from the prior art. The resulting panels, which have a cellular core and a skinned surface, have a specific gravity ranging from about 0.6 to 0.9, usually about 0.8, have the following physical properties at a ¼ inch thickness:

TABLE 1

| | |
|---|---|
| Falling Ball Impact Strength, ft -lbs | 45 |
| Flammability, UL-94 | SE-O |
| Heat Distortion Temperature, °F, 264 psi | 270 |
| Flexural Strength, psi | 10,000 |
| Flexural Modulus, psi | 300,000 |
| Compressive Strength, psi | 7,500 |
| Tensile Strength, psi | 5,500 |
| Mold Shrinkage, in/in | 0.004–0.005 |

This is compared with the prior art form structural foams systems which were inherently of much greater specific gravity and which had no comparable physical properties at high and low temperatures.

It should also be noted that the process hereof is unique in the sense that heretofore polycarbonates have been used in automotive application, but only in solid form, not as a structural foam. The solid polycarbonates are distinct from structural foams in that they require high pressure processes and are restricted in size and shape. This is not true with the present structural foam.

It is apparent from the preceding that the exterior frame or assembled panels is not solely limited to automobiles, although the primary disclosure hereof is limited thereto. The present invention is useful in the fabrication of structural members for self-propelled terrain vehicles, e.g., snowmobiles, water vehicles, and the like.

For a more complete understanding of the present invention reference is made to the non-limiting example thereof.

EXAMPLE

This example illustrates the preparation of a front fender automotive panel in accordance with the present invention using a low pressure process.

Into a Conair desiccant dryer is charged 5.61 pounds of a polycarbonate resin consisting essentially of 95% by weight of the polycarbonate of Bisphenol A and about 5% by weight of silicon dioxide. The resin is maintained in the dryer for about 2.5 hours at about 250°F. The resin, having a moisture content of 0.01% by weight, is then transferred into the first stage of a two-stage extruder comprising a portion of a Springfield Cast Products structural foam machine. The resin is subjected to a temperature of about 550°F and a pressure of about 3,500 psi in the extruder. At the end of the first stage 1.68 pounds of nitrogen gas under a pressure of about 2,300 psi is admixed with the resin and the resulting foamable mixture travels through the second stage.

From the extruder the mixture is advanced to an accumulator wherefrom in about 1 second it is shot through suitable nozzles into a mold. The accumulator is at a temperature of 560°F. The mixture is delivered through the nozzles at a pressure of 3,300 psi and at a temperature of 565°F.

The mold or die which is conformed to a front fender panel is maintained at a temperature of 190°F, wherefrom the finished fender panel having a skin thickness of about 0.05 inches is produced in 2 minutes.

It is apparent herefrom that by proper mold design hinges and other functional parts necessary for assembleage can be directly molded integrally with the panel.

Furthermore, by proper mold design it is possible to control and vary the density and skin thickness of any molded panel at any place thereon.

Having thus described the invention, what is claimed is:

1. In a process for molding an exterior automotive structural foam body panel, the improvement which comprises:
   injection foam molding, in the presence of a blowing agent selected from the group consisting of nitrogen and nitrogen-release compounds, and in a mold maintained at a temperature of from about 90° to about 250°F and in a time period of from about 0.5 to 6.0 minutes, a polycarbonate resin, pre-dried to a moisture content of about 0.015% of water, based on the weight of the polycarbonate, the polycarbonate resin consisting essentially of from about 80 to 99% by weight, based on the total weight of a polycarbonate of 2,2-bis (4-hydroxyphenyl) propane and from about 1 to 20% by weight, based on the total weight, of silicon dioxide, to provide the exterior structural foam automotive body panel.

2. The process of claim 1 wherein the blowing agent is nitrogen.

3. The process of claim 1 wherein the resin is foam molded about a steel member.

4. The process of claim 1 wherein the resin is foam molded in a mold maintained at a temperature of from about 90° to 250°F and in a time period of from about 0.5 to 2 minutes.

5. The product produced in accordance with the process of claim 1.

6. The product produced in accordance with the process of claim 2.

7. An exterior vehicle body produced by assembling a plurality of the panels prepared in accordance with claim 1.

* * * * *